United States Patent [19]
Song et al.

[11] Patent Number: 5,397,580
[45] Date of Patent: Mar. 14, 1995

[54] CONTINUOUS GUM BASE MANUFACTURE USING SEQUENTIAL MIXERS

[75] Inventors: Joo H. Song, Northbrook; Donald J. Townsend, Chicago, both of Ill.

[73] Assignee: Wm. Wrigley Jr. Company, Chicago, Ill.

[21] Appl. No.: 141,399

[22] Filed: Oct. 22, 1993

[51] Int. Cl.⁶ ............................................. A23G 3/30
[52] U.S. Cl. ...................... 426/5; 426/516; 264/211; 425/204; 425/208
[58] Field of Search ........................ 426/3–6, 426/516; 264/211; 425/204, 208

[56] References Cited

U.S. PATENT DOCUMENTS

| | | | |
|---|---|---|---|
| 1,852,005 | 4/1934 | Garbutt | 426/3 |
| 1,953,295 | 4/1934 | Garbutt | 426/5 |
| 2,256,190 | 9/1941 | Bowman | 426/5 |
| 3,995,064 | 11/1976 | Ehrgott | 426/5 |
| 4,068,004 | 1/1978 | Carlin et al. | 426/3 |
| 4,187,320 | 2/1980 | Koch et al. | 426/3 |
| 4,208,431 | 6/1980 | Friello et al. | 426/3 |
| 4,217,368 | 8/1980 | Witzel et al. | 426/5 |
| 4,305,962 | 12/1981 | del Angel | 426/3 |
| 4,459,311 | 7/1984 | DeTora et al. | 426/3 |
| 4,555,407 | 11/1985 | Kramer et al. | 426/5 |
| 4,876,095 | 10/1989 | Yang | 426/3 |
| 4,968,511 | 11/1990 | D'Amelia et al. | 426/6 |
| 5,045,325 | 9/1991 | Lesko et al. | 426/3 |
| 5,059,103 | 10/1991 | Bruckmann et al. | 425/67 |
| 5,135,760 | 8/1992 | Degady et al. | 426/5 |

FOREIGN PATENT DOCUMENTS

| | | | |
|---|---|---|---|
| 0273809 | 7/1988 | European Pat. Off. | A23G 3/30 |
| 2635441 | 2/1990 | France | A23G 3/30 |
| 1538785 | 1/1979 | United Kingdom | C08J 3/20 |

OTHER PUBLICATIONS

Brochure: "The Teledyne Readco Continuous Processor", by Teledyne Readco, York, Pa. (date unknown).
Brochure: "Leistritz Extrusionstechnik—The Multi-Extrusion System", by Leistritz (date unknown).
Brochure: "Leistritz Extrusionstechnik—The Universal Laboratory Extruder System", by Leistritz (date unknown).
Brochure: "D-Tex Continuous Compounding Twin Screw Extruders", by Davis-Standard (date unknown).

*Primary Examiner*—Jeanette Hunter
*Attorney, Agent, or Firm*—Willian Brinks Hofer Gilson & Lione; Maxwell J. Petersen

[57] ABSTRACT

A continuous method of making chewing gum base is provided wherein two continuous mixers are arranged in series. A higher viscosity portion including elastomer, filler, and elastomer plasticizer is continuously added and mixed in the first continuous mixer to form a blend. The blend is ventilated after leaving the first continuous mixer. The blend from the first continuous mixer is continuously added to the second continuous mixer. A lower viscosity portion including softener/emulsifier and, optionally, wax and additional elastomer plasticizer, is also continuously fed to the second continuous mixer and mixed therein with the blend from the first continuous mixer to form chewing gum base.

25 Claims, 5 Drawing Sheets

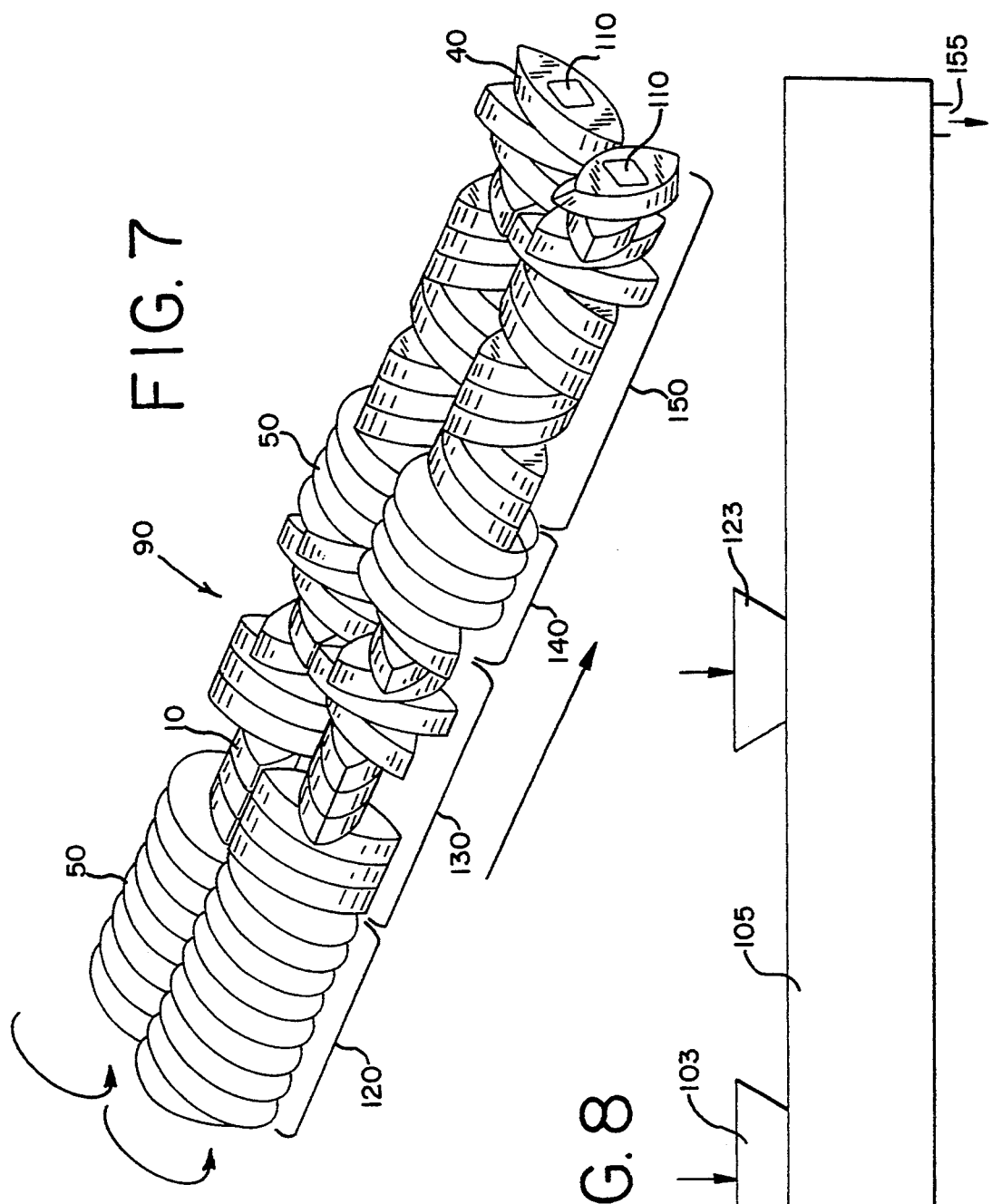

CONTINUOUS GUM BASE MANUFACTURE USING SEQUENTIAL MIXERS

FIELD OF THE INVENTION

This invention relates to a continuous method for making chewing gum base. More specifically, this invention is directed to a method for making chewing gum base using at least two continuous mixers arranged in sequence.

BACKGROUND OF THE INVENTION

Chewing gum base is conventionally prepared using a batch mixer, for example, a sigma blade mixer, using a mixing time of about one to four hours per batch. Typically, predetermined amounts of elastomer, elastomer plasticizers and fillers are added to a heated sigma blade mixer having a front to rear blade speed ratio of about 2:1. After the initial ingredients have massed homogeneously, a balance of elastomer plasticizer, filler, softeners/emulsifiers, waxes (when used) and other ingredients are added sequentially to the batch mixer and blended until a homogeneous mass is attained. The final mass temperature can be between 60° C. and 150° C., preferably between 80° C. and 120° C. The completed molten mass is emptied from the mixing kettle into coated or lined pans, extruded or cast into any desirable shape and allowed to cool and solidify.

The foregoing batch process, which operates under conditions of low shear and little or no pressure, has been very effective in providing well-mixed chewing gum bases, with little or no degradation of the gum base components occurring during mixing. However, the process has the disadvantage of requiring a long mixing time. Also, because the process involves batch mixing, not at steady state, there may be small but detectable variations in color, consistency or taste between different batches.

In order to shorten the mixing time and eliminate variations between batches, consideration has been given to mixing gum base continuously. However, most known continuous mixing processes, for example, twin screw extruders, have been difficult to use successfully because their residence time is too short, i.e., on the order of a few minutes. This extreme shortening of residence time has made it difficult to produce a homogeneous gum base without lumps, islands, and other inconsistencies.

U.S. Pat. No. 3,995,064, issued to Ehrgott et al., discloses the concept of making chewing gum base continuously. To accomplish this, the gum base must be exposed to some mixing under high intensity and shear, in order to disperse the elastomer. However, high shear mixing may increase the amount of degraded gum base ingredients in the product. Also, the reference recommends using a number of separate preblending operations to help achieve product homogeneity.

French Publication No. 2,635,441, to Boudy, discloses making a gum base concentrate using a continuous process. Polymers, plasticizers and fillers are introduced into different sleeves of a twin screw extruder having a residence time not exceeding 1.5 minutes. The twin screw extruder includes a region of high shear mixing to help disperse the ingredients. Later, the gum base premix is combined with other gum base ingredients using a separate process.

European Publication No. 0,273,809, to Horst, discloses a process for making a chewing gum base using an industrial mill. Elastomer and filler are fed to the mill, heated, and mixed for 35 to 75 minutes, to produce a gum base premix. The premix is then discharged from the mills fragmented, and combined with other gum base ingredients using a powder mixer.

U.S. Pat. No. 4,217,368, issued to Witzel et al., and U.S. Pat. No. 4,208,431, issued to Friello et al., disclose standard batch gum base processes using sigma blade mixers. U.S. Pat. 4,968,511, issued to D'Amelia et al., discloses a direct one-step process for making chewing gum without the intermediate step of forming a chewing gum base, using a specific mixture of ingredients.

Notwithstanding the foregoing efforts, there remains a need or desire in the chewing gum industry for an effective method of making a chewing gum base continuously, to save time and eliminate inconsistencies between batches, preferably without using high shear or employing batch preblending steps.

SUMMARY OF THE INVENTION

The present invention is a process for continuous gum base manufacture which employs at least two continuous mixers arranged in series. By "in series" it is meant that all of the gum base ingredients which exit from a first continuous mixer, are fed into a second continuous mixer. Additional gum base ingredients are also fed into the second continuous mixer.

At least some of the elastomer and filler used in the gum base are added to and mixed in the first continuous mixer. At least some of the softeners/emulsifiers used in the gum base are added to and mixed in the second continuous mixer without being added to the first continuous mixer. The aggregate viscosity of all the ingredients added to and blended in the second continuous mixer, is lower than the aggregate viscosity of all the ingredients added to and blended in the first continuous mixer.

Other gum base ingredients can be initially added to either continuous mixer. Preferably, at least some of the elastomer plasticizer is initially added to the first continuous mixer. Preferably, at least some of the wax (when used) is initially added to the second continuous mixer. An objective is to create a relatively lower intensity (for example, lower rpm) mixing environment in the first continuous mixer for blending and interdispersing the higher viscosity ingredients before the lower viscosity ingredients are added. This can advantageously be done in the absence of softeners/emulsifiers and waxes, which interfere with the initial intermixing of elastomer, filler and elastomer plasticizer. Then, after the higher viscosity ingredients are interdispersed, the blend is fed continuously to the second continuous mixer for combination with softeners/emulsifiers and (when used) waxes, under relatively higher intensity (for example, higher rpm) conditions.

With the foregoing in mind, it is a feature and advantage of the invention to provide a continuous method for making chewing gum base which permits different mixing conditions to be used at different stages of addition of gum base ingredients.

It is also a feature and advantage of the invention to provide a continuous method for making chewing gum base which provides higher total mixing times, and/or higher production rates, than conventional self-contained continuous mixers.

It is also a feature and advantage of the invention to provide a continuous method for making chewing gum base which employs lower shear than conventional continuous processes.

It is also a feature and advantage of the invention to provide a continuous method for making gum base which mixes and ventilates the mixture of elastomer, filler and, optionally, elastomer plasticizer, before the softeners/emulsifiers are added.

It is also a feature and advantage of the invention to provide a continuous method for making chewing gum base which allows greater flexibility in adding different gum base ingredients at different stages of the mixing process.

The foregoing and other features and advantages of the invention will become further apparent from the following detailed description of the presently preferred embodiments, when read in conjunction with the accompanying examples and drawings. The detailed description, examples and drawings are merely illustrative rather then limiting, the scope of the invention being defined by the appended claims and equivalents thereof.

BRIEF DESCRIPTION OF THE DRAWINGS

FIG. 7 is a perspective view of an overall paddle mixing configuration reflecting a presently preferred embodiment.

FIG. 8 is a schematic illustration of a barrel and feeder arrangement which can be used in conjunction with the paddle mixer configuration shown in FIG. 7.

DETAILED DESCRIPTION OF THE PRESENTLY PREFERRED EMBODIMENTS

Figure 1:
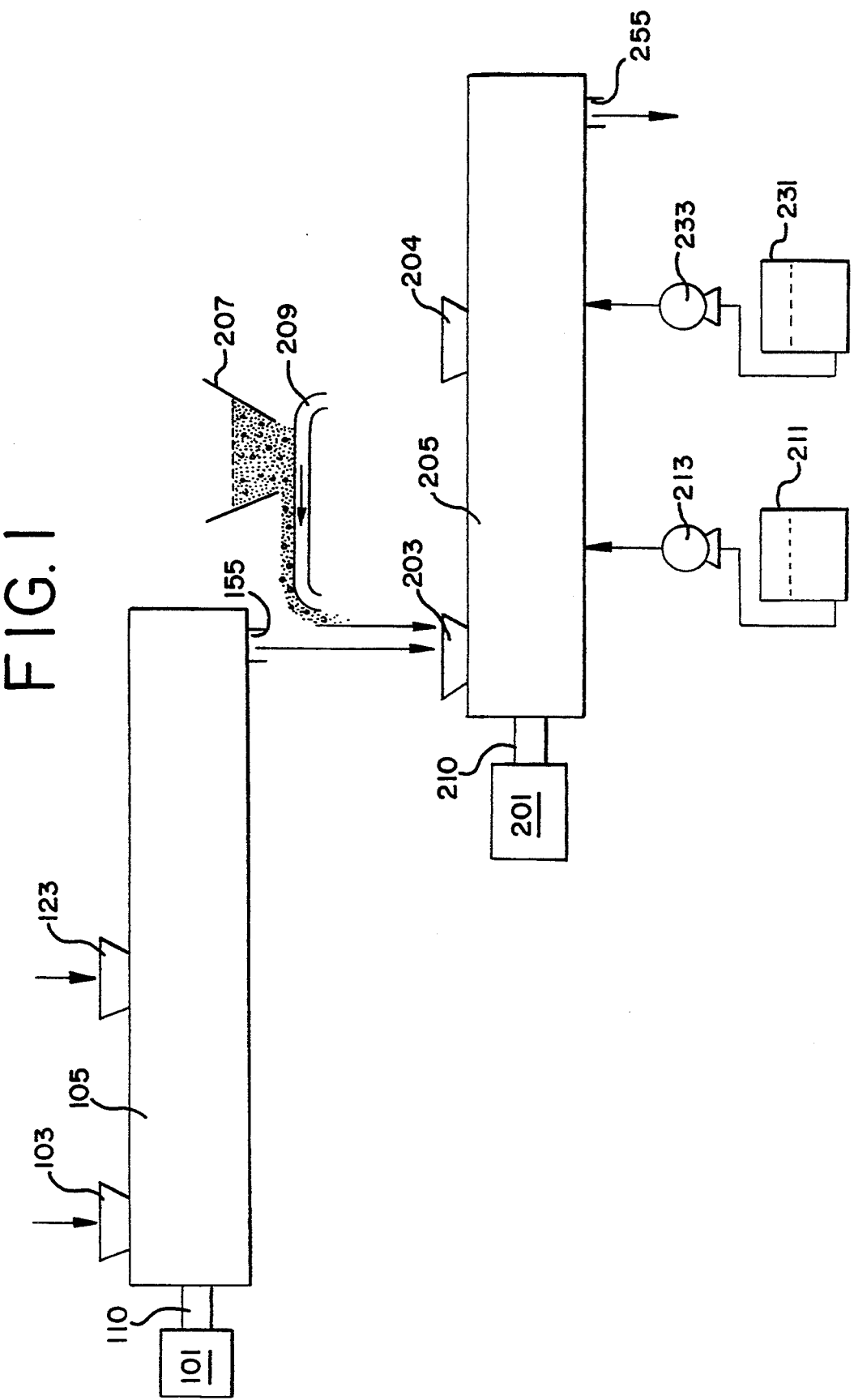
FIG. 1 is a schematic diagram showing two continuous mixers arranged in series, in accordance with the process of the invention.

Referring to FIG. 1, a continuous gum base manufacturing process is shown schematically including a first continuous mixer 100 and a second continuous mixer 200, arranged in series. The continuous mixer 100 may be a paddle mixer, a co-rotating twin screw extruder, a counter-rotating twin screw extruder, another type of continuous mixing extruder, or another type of continuous mixer. Preferably, the continuous mixer 100 is a paddle mixer as hereinafter described.

The continuous mixer 200 may also be a paddle mixer, a co-rotating twin screw extruder, a counter-rotating twin screw extruder, another type of continuous mixing extruder, or another type of continuous mixer. The continuous mixer 200 may be the same or a different kind as the continuous mixer 100, may have the same or different mixer configuration, and may be the same or a different size. Preferably, the continuous mixer 200 is also a paddle mixer, but differs from the mixer 100 both in size and mixer configuration, as hereinafter discussed in the Examples.

The first continuous mixer 100 includes an upstream feed port 103 and a downstream feed port 123 for selective continuous addition of gum base ingredients. A combination of elastomer, filler and elastomer plasticizer resin can be continuously fed via upstream feed port 103, to the first barrel section 105 of the mixer. These materials are mixed in the mixing barrel section 115, after which additional elastomer plasticizer resin can be added to the third barrel section 125 via the downstream feed port 123. The combined "higher viscosity" ingredients are further blended in the downstream mixing barrel sections 135 and 145 before leaving the first mixer at the exit 155.

While the barrel arrangement, locations of feed ports, specific ingredients fed, and specific quantities may vary with the mixer type and gum base type being made, it is understood that the first mixer 100 is generally used for introducing and initially blending the higher viscosity components of the chewing gum base, at relatively lower intensity conditions (for example, lower rpm) than are used subsequent to the first mixer 100. Also, it is preferred that the combined viscosity of the ingredients entering the upstream feed port 103 is higher than the combined viscosity of the ingredients entering the downstream feed port 123, at the mixer temperature.

For example, a gum base having a relatively high level of elastomer may be made by initially adding all the filler and some of the elastomer at the upstream feed port 103, with the remaining elastomer and elastomer plasticizer resin being added at the downstream feed port 123. A gum base having a relatively high level of filler may be made by adding some of the filler and all of the elastomer at the upstream feed port 103, and the remaining filler and elastomer plasticizer resin at the downstream feed port 123. A gum base having a relatively high level of elastomer plasticizer resin may be made by adding elastomer, filler, and some elastomer plasticizer resin at the upstream feed port 103, with the remaining elastomer plasticizer resin being added at the downstream feed port 123. These examples are based on the assumption that the viscosity of the filler (indefinitely large) exceeds the velocity of the elastomer which, in turn, exceeds the velocity of the elastomer plasticizer resin.

The higher viscosity ingredients combined in the first continuous mixer 100 are ventilated upon leaving the mixer 100 through the exit 155, and are continuously fed into an upstream feed port 203 in barrel section 205 of the second continuous mixer 200. Additional plastic polymers (for example, polyvinyl acetate) can also be continuously fed into the feed port 203 via the feed hopper 207 and conveyor 209. A softener/emulsifier, such as a fat or oil, or a wax, can be added via a tank 211 (which can be a heated tank) and a liquid pump 213, to the barrel 205 of the second continuous mixer 200. Optionally, a portion of ingredients can be added into a downstream feed port 204. The ingredients are blended in the second continuous mixer, whereupon an additional quantity of softener/emulsifier or wax can be added to the barrel 205 via tank 231 (which can be heated) and liquid feed pump 233. All of the gum base ingredients are further mixed in the second continuous mixer, and the gum base product leaves the second continuous mixer 200 through the exit 255.

While the barrel arrangements, locations of feed ports, specific ingredients fed and specific quantities may again be varied for the second continuous mixer 200, it is understood that the second continuous mixer 200 is generally used for introducing and initially blending the lower viscosity components into the higher viscosity components of the gum base, at relatively higher intensity conditions (for example, higher rpm) than used in the first continuous mixer 100. Again, it is preferred that the lowest viscosity ingredients (for example, the lowest viscosity fats and oils) be added furthest downstream in the second continuous mixer 200. Depending on the specific gum base composition, it may be desirable to add some of the ingredients typically added to the first mixer 100 (for example, a minor portion of the elastomer, elastomer plasticizer or filler) initially to the second mixer 200. However, it is of utmost importance that the combined viscosity of all gum base ingredients initially added (that is, added to the process for the first time) into the second mixer 200, be lower than the combined viscosity of all gum base ingredients initially added to the first mixer 100.

The process of the invention contemplates the use of at least two continuous mixers arranged in series. The advantages of the invention (for example, process variability, increased residence time, production rate, product homogeneity and feed order flexibility) may be further extended by using three or more continuous mixers arranged in series. Regardless of the number of mixers used, it is important that the combined viscosity of ingredients initially added into each successive mixer be lower than the combined viscosity of ingredients added into each preceding mixer. It is also preferred that when two or more feed ports are used in one of the mixers, the combined viscosity of ingredients initially added at a downstream location is lower than the combined viscosity of ingredients initially added at each upstream location.

The method of the invention contemplates the making of any commercial chewing gum base product. Elastomers may constitute about 5 to about 95 percent by weight of the gum base, preferably between 10 and 70 percent by weight and most preferably between 15 and 45 percent by weight. Elastomers may include synthetic elastomers such as polyisobutylene, isobutylene-isoprene copolymer, and styrene-butadiene copolymer; plastic polymers such as polyvinylacetate, vinyl acetate-vinyl laurate copolymer or mixtures thereof. Natural elastomers may also include natural rubber such as smoked or liquid latex and guayule as well as natural gums such as jelutong, lechi caspi, perillo, massaranduba balata, massaranduba chocolate, nispero, rosindinha, chicle, gutta hang kang or mixtures thereof.

Elastomer plasticizers may constitute from about 0 to about 75 percent by weight of the gum base, preferably 5 to 45 percent by weight and most preferably 10 to 30 percent by weight. Elastomer plasticizers include natural rosin esters such as glycerol ester of partially hydrogenated rosin, glycerol ester of polymerized rosin, glycerol ester of partially dimerized rosin, glycerol ester of rosin, pentaerythritol esters of partially hydrogenated rosin, methyl and partially hydrogenated methyl esters of rosin, pentaerythritol ester of rosin or mixtures. Elastomer plasticizers also include synthetics such as terpene resins derived from alpha-pinene, beta-pinene and/or d-limonene.

Waxes include synthetic (e.g. polyethylene and Fischer-Tropsch waxes), natural (candelilla carnauba, beeswax, rice bran or mixtures thereof) and petroleum (e.g. microcrystalline and paraffin). Waxes, when used, generally constitute up to 30 weight percent of the gum base.

Softeners/emulsifiers include tallow, hydrogenated tallow, hydrogenated and partially hydrogenated vegetable oils, cocoa butter, glycerol monostearate, glycerol triacetate, lecithin, mono-, di- and triglycerides, acetylated glycerides and fatty acids (e.g. stearic, palmitic, oleic, linoleic and linolenic acids) or mixtures thereof. Softeners/emulsifiers generally constitute between 0.5 and 40 weight percent of the gum base.

Fillers/texturizers include magnesium and calcium carbonate, ground limestone and silicate types such as magnesium and aluminum silicate, clay, alumina, talc as well as titanium oxide, mon-, di- and tricalcium phosphate, cellulose polymers such as ethyl, methyl and wood or mixtures thereof. Preferably, the filler comprises about 1 to about 65 percent by weight of the gum base.

Colorants and whiteners include FD&C-type dyes and lakes, fruit and vegetable extracts, titanium dioxide or mixtures thereof.

In a preferred embodiment, the first continuous mixer 100 and second continuous mixer 200 are both paddle mixers. Referring to FIGS. 2(a)-3(a), a mixing paddle 10 having a flat (non-helical) configuration is shown. The term "mixing paddle" is defined herein as a four-sided mixing element having two flat surfaces 12 and 14, and two concave surfaces 16 and 18. The flat surfaces are parallel to each other and intersect only the concave surfaces. The concave surfaces oppose each other and intersect each other at two lines 20 and 22. A non-circular (preferably square) opening 24 passes through the center of each mixing paddle 10, in a direction perpendicular to the flat surfaces 12 and 14, and intersects both flat surfaces. The openings 24 are used for mounting a plurality of paddles on rotating shafts 110, in a predetermined sequence (FIG. 7).

Referring to FIGS. 3(a)–3(d), the mixing paddles 10 can be positioned on a shaft at the same or different rotational angles relative to each other. For purposes of the following description, the "No. 1 position" is defined pursuant to FIG. 3(a), wherein a straight line drawn on the flat surface 14 and intersecting the lines 20 and 22 coincides with a reference line (for example, a vertical line). The "No. 2 position" is defined pursuant to FIG. 3(b), wherein a straight line drawn on the flat surface 14 and intersecting the lines 20 and 22 is 45 degrees counter-clockwise from the reference line. The "No. 3 position" is defined pursuant to FIG. 3(c), wherein a straight line drawn on the flat surface 14 and intersecting the lines 20 and 22 is 90 degrees counter-clockwise from the reference line. The "No. 4 position" is defined pursuant to 3(d), wherein a straight line drawn on the flat surface 14 and intersecting the lines 20 and 22 is 135 degrees counter-clockwise from the reference line.

Because the paddles 10 in FIGS. 3(a)–3(d) are symmetrical, there is no need to further define the relative rotational positions of the paddles for angles of 180, 225, 270 and 315 degrees from the reference line. For example, a paddle having a rotational position of 180 degrees coincides exactly with a paddle having a rotational angle of zero (FIG. 3(a)). Similarly, a paddle having a rotational angle of 225 degrees coincides exactly with a paddle having a rotation angle of 45 degrees (FIG. 3(b)); a paddle having a rotational angle of 270 degrees coincides exactly with a paddle having a rotational angle of 90 degrees (FIG. 3(c)), and a paddle having a rotational angle of 315 degrees coincides exactly with a paddle having a rotational angle of 135 degrees (FIG. 3(d)).

It is also understood that each mixing paddle 10 will be in constant rotation during operation of the paddle mixer, due to the rotation of the shafts supporting the paddles (FIG. 7). For purposes of describing the mixing paddles in terms of relative rotational positions (i.e. relative to each other) as explained above, the reference line should be deemed to rotate as the paddles rotate. For example, if the mixing paddles shown in FIGS. 3(a)–3(d) are positioned sequentially on a single shaft, and if the shaft is rotated 90 degrees, then the chosen reference line, initially vertical, would rotate to a horizontal position. In other words, the relative rotational positions of the mixing paddles in FIGS. 3(a)–3(d), defined respectively as 1-2-3-4, will not change during operation of the paddle mixer.

Figure 4A:
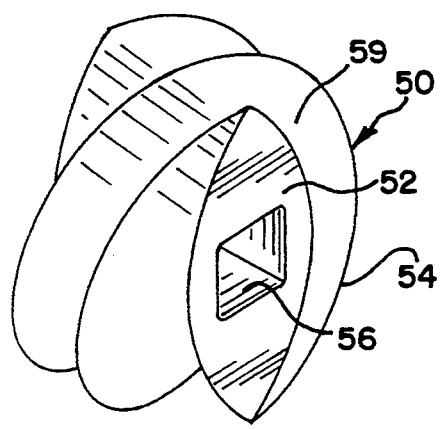
FIG. 4(a) is a perspective view of a feeding element (not a paddle element) used in the feed areas of a paddle mixer.
Figure 4B:
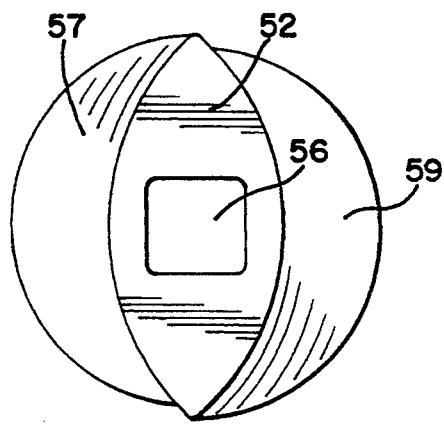
FIG. 4(b) is a front view of the feed element of FIG. 4(a).

Referring to FIGS. 4(a) and 4(b), the method of the invention also provides for the use of a minor portion of non-paddle elements known as forward conveying or feed elements 50. Each feed element 50 has a flat front surface 52, a flat back surface 54 parallel to the front surface, and a non-circular (preferably square) opening 56 perpendicular to and intersecting the front and back surfaces. However, unlike the mixing paddles described above, the feed elements do not have two concave surfaces intersecting at two lines. Instead, each feed element 50 includes portions of two alternating helical channels 57 and 59. The helical channels are more apparent in FIG. 7 wherein a plurality of feed elements 50 are combined in sequence on the rotating shafts 110 to form feed sections in the mixer. The primary purpose of the feed elements 50 is to convey chewing gum base ingredients forward to the regions of the mixer where paddle mixing takes place.

Figure 5A:
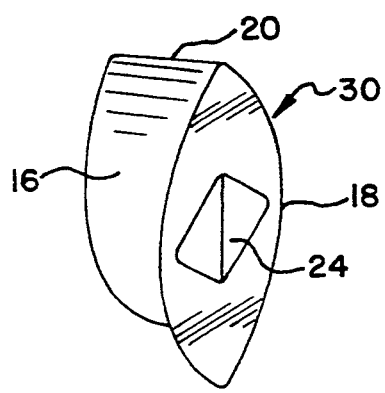
FIG. 5(a) is a perspective view of a forward helical mixing paddle which can be used in accordance with the process of the invention.
Figure 5B:
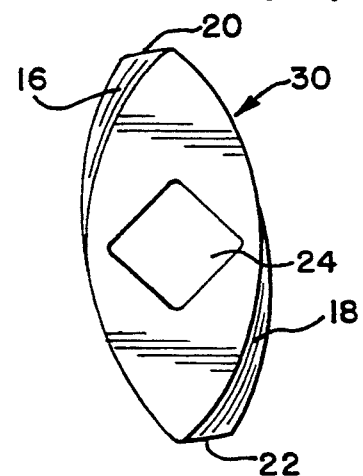
FIG. 5(b) is a front view of the forward helical mixing paddle of FIG. 5(a).

Referring to FIGS. 5(a) and 5(b), a type of mixing paddle known as a forward helical paddle 30 can also be used with the method of the invention. When used, the forward helical paddle 30 imparts a slight forward conveying action while mixing the gum base ingredients. Like the flat mixing paddles 10, each forward helical paddle 30 has two flat surfaces 12 and 14, and two concave surfaces 16 and 18. The flat surfaces are parallel to each other and intersect only the concave surfaces. The concave surfaces oppose each other and intersect at two lines 20 and 22. Again, a non-circular (preferably square) opening 24 passes through the center of each mixing paddle 30 and intersects both flat surfaces.

Figure 2B:
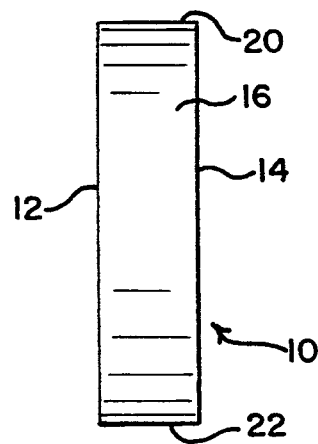
FIG. 2(b) is a side view of the mixing paddle of FIG. 2(a).
Figure 2A:
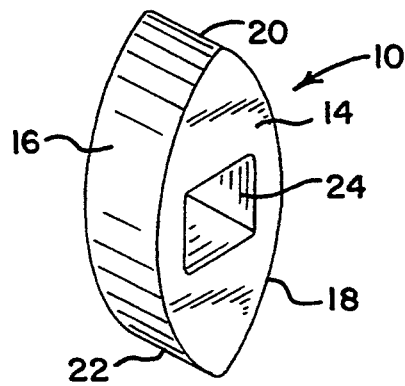
FIG. 2(a) is a perspective view of a mixing paddle which can be used in a preferred embodiment of the invention.
Figure 3A:
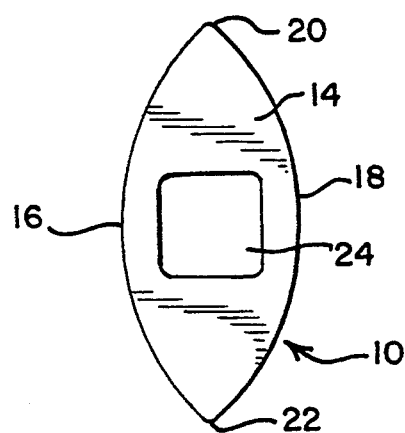
FIG. 3(a) is a front view of the mixing paddle of FIG. 2(a), shown at zero degrees rotation (referred to as the no. 1 position).
Figure 3B:
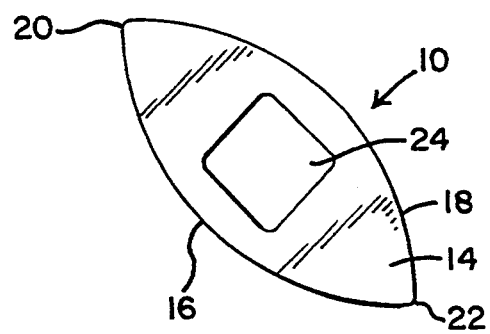
FIG. 3(b) is a front view of the mixing paddle of FIG. 2(a), shown at 45 degrees counter-clockwise rotation (referred to as the no. 2 position).
Figure 3C:
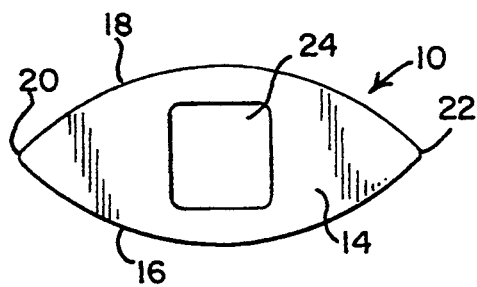
FIG. 3(c) is a front view of the mixing paddle of FIG. 2(a), shown at 90 degrees counter-clockwise rotation (referred to as the no. 3 position).
Figure 3D:
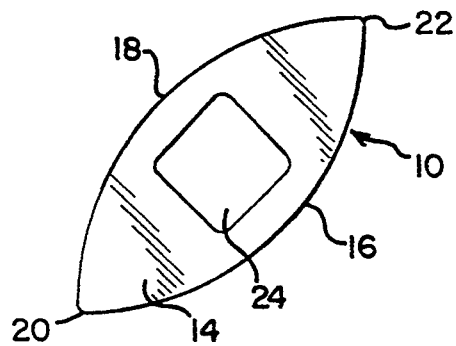
FIG. 3(d) is a front view of the mixing paddle of FIG. 2(a), shown at 135 degrees counter-clockwise rotation (referred to as the no. 4 position).

The difference between the forward helical paddle 30 and the flat mixing paddle 10 is that, in the flat mixing paddle 10, the lines 20 and 22 (defining the intersections of concave surfaces 16 and 18) are parallel to each other as shown in FIG. 2(a). In the forward helical paddle, the line 20 has been rotated counter-clockwise with respect to the line 22 so that the lines are no longer parallel, as shown in FIG. 5(b). Similarly, the line 22 has been rotated clockwise with respect to the line 20. The effect of this rotation is to bend the concave surfaces 16 and 18 so that these surfaces have a mildly helical configuration.

Figure 6A:
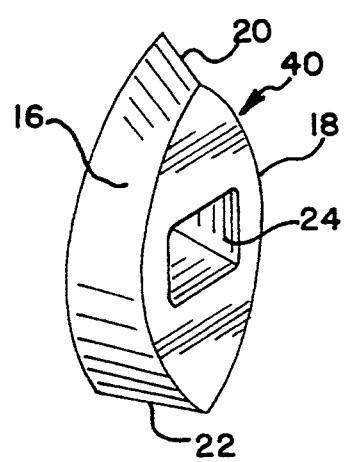
FIG. 6(a) is a perspective view of a reverse helical mixing paddle which can be used in accordance with the process of the invention.
Figure 6B:
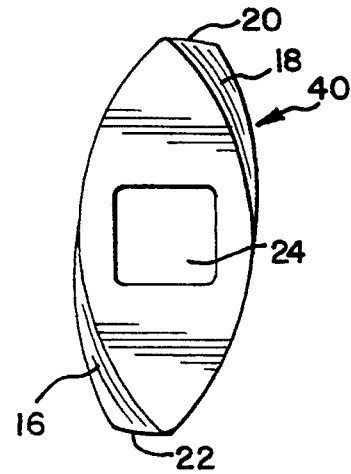
FIG. 6(b) is a front view of the reverse helical mixing paddle of FIG. 6(a).

Referring to FIGS. 6(a) and 6(b), a type of mixing paddle known as a reverse helical paddle 40 can also be used with the method of the invention. When used, the reverse helical paddle 40 imparts a slight resistance to forward conveying of the gum base ingredients while mixing the ingredients. This causes a locally higher degree of mixer fill and slight elevation in pressure, in the vicinity of the reverse helical paddle 40.

The reverse helical paddle 40 is configured in the same fashion as the forward helical pattern 30 discussed above, except that the lines 20 and 22 (defining the intersections of concave surfaces 16 and 18) are rotated in the opposite directions. Referring to FIG. 6(b), the line 20 has been rotated clockwise with respect to the line 22, and the line 22 has been rotated counter-clockwise with respect to the line 20. The effect of this rotation is to bend the concave surfaces 16 and 18 so that these surfaces have a mild reverse helical configuration.

Figure 5C:
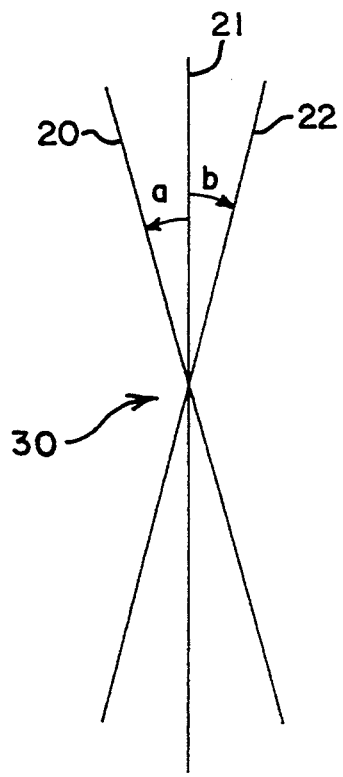
FIG. 5(c) is based on a top view of the forward helical mixing paddle of 5(a), showing only the top intersection line 22 superimposed over the bottom intersection line 20, and a reference line 21.
Figure 6C:
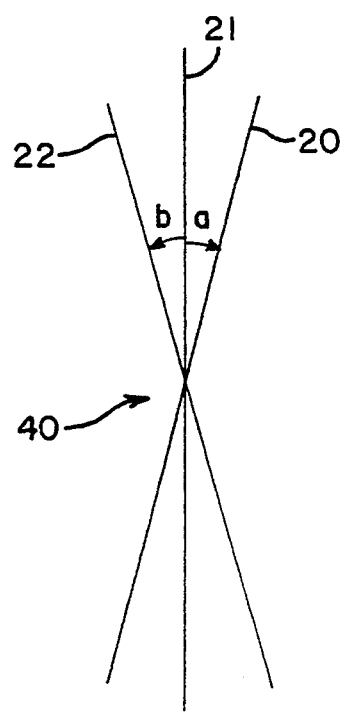
FIG. 6(c) is based on a top view of the reverse helical mixing paddle of FIG. 6(a), showing only the top intersection line 22 superimposed over the bottom intersection line 20, and a reference line 21.

The degree of rotation of lines 20 and 22 for the forward and reverse helical paddles 30 and 40 can be explained with reference to FIGS. 5(c) and 6(c). In FIGS. 5(c) and 6(c), the helical paddles have been viewed from above and only the lines 20 and 22 of the paddles are shown, superimposed one on top of the other. A reference line 21 is also shown, indicating the positions of lines 21 and 22 if there were no rotation, as in a flat paddle 10.

Referring to FIG. 5(c), the angle "a" is the amount of counter-clockwise rotation of line 20 present in a forward helical paddle 30. The angle "a" should be between about 5 and about 30 degrees, preferably between about 10 and about 18 degrees, most preferably about 13 degrees, 53 minutes, 50 seconds. The angle "b" is the amount of clockwise rotation of line 22 present in a forward helical paddle 30. The angle "b" should be between about 5 and about 30 degrees, preferably between about 10 and about 18 degrees, most preferably about 13 degrees, 53 minutes, 50 seconds.

Referring to FIG. 6(c), the angle "a" is the amount of clockwise rotation of line 20 present in a reverse helical paddle 40. The angle "a" should be between about 5 and about 30 degrees, preferably between about 10 and about 18 degrees, most preferably about 13 degrees, 53 minutes, 50 seconds. The angle "b" is the amount of counter-clockwise rotation of line 22 present in a reverse helical paddle 40. The angle "b" should be between about 5 and about 30 degrees, preferably between about 10 and about 18 degrees, most preferably about 13 degrees, 53 minutes, 50 seconds.

Referring to FIG. 7, inside each continuous paddle mixer, the mixing paddles and feed elements are assembled on two parallel shafts 110 in a predetermined configuration. In the embodiment shown, for a 5 inch paddle mixer each of the shafts 110 has an active length of 36 inches and a square cross-sectional area of 1.375 inches×1.375 inches (1.891 square inches). The parallel shafts 110 are spaced apart at a distance of 3.5 inches (center to center). The shafts 110 are adapted for co-rotation (rotation in the same direction) inside a mixing barrel. Each of the shafts 110 supports an identical arrangement of mixing paddles and feed elements. The mixing paddles and feed elements on the adjacent shafts may intermesh, as shown in FIG. 7, but do not touch each other, as the shafts rotate.

Each of the shafts 110 is long enough to accommodate thirty-six inches of elements, each having a length of 1 inch, a maximum diameter of 4.874 inches, and a minimum diameter of 2 inches. Two or more 1-inch segments may be combined to make longer elements without affecting the operation. For example, the feed elements 50 often have a length of 2 inches. In each of the paddle mixers, at least about 40 percent of each shaft should be covered with mixing paddles. Preferably at least about 50 percent of each shaft is covered with mixing paddles, most preferably at least about 60 percent. Of the mixing paddles, a majority should be flat mixing paddles as opposed to forward helical or reverse helical paddles. In the paddle mixer embodiment shown in FIG. 7, 67 percent of the shaft length is covered with mixing paddles (24 one-inch elements) and 33 percent of the shaft length is covered with feed elements (6 two-inch elements).

The mixer configuration 90 in FIG. 7 includes two feed sections 120 and 140, and two paddle mixing sections 130 and 150. The specific mixer configuration is indicated in Table 1 below. In Table 1 and other tables, the following abbreviations are used:

FC—feed conveying element (each occupying two 1-inch positions)
FP—flat mixing paddle (each occupying one 1-inch position)
FH—forward helical mixing paddle (each occupying one 1-inch position)
RH—reverse helical mixing paddle (each occupying one 1-inch position)

TABLE 1

| Mixer Configuration (Per Shaft) - FIG. 7 | | | | | |
|---|---|---|---|---|---|
| Longitudinal Position | Element | Rotational Position | Longitudinal Position | Element | Rotational Position |
| 1 | FC | 4 | 19 | FP | 3 |
| 2 | FC | 4 | 20 | FC | 3 |
| 3 | FC | 4 | 21 | FC | 3 |
| 4 | FC | 4 | 22 | FC | 3 |
| 5 | FC | 4 | 23 | FC | 3 |
| 6 | FC | 4 | 24 | FP | 3 |
| 7 | FC | 4 | 25 | FP | 3 |
| 8 | FC | 4 | 26 | FP | 3 |
| 9 | FP | 4 | 27 | FP | 1 |

TABLE 1-continued

| Mixer Configuration (Per Shaft) - FIG. 7 | | | | | |
|---|---|---|---|---|---|
| Longitudinal Position | Element | Rotational Position | Longitudinal Position | Element | Rotational Position |
| 10 | FP | 4 | 28 | FP | 1 |
| 11 | FP | 4 | 29 | FP | 1 |
| 12 | FP | 2 | 30 | FP | 3 |
| 13 | FP | 2 | 31 | FP | 3 |
| 14 | FP | 2 | 32 | FP | 3 |
| 15 | FP | 3 | 33 | FP | 4 |
| 16 | FP | 4 | 34 | FP | 1 |
| 17 | FP | 1 | 35 | FP | 2 |
| 18 | FP | 2 | 36 | RH | 1 |

The use of two or more feed sections and two or more mixing sections in the mixer configuration 90, of one or both continuous paddle mixers, permits sequential addition and mixing of different gum base ingredients within the continuous paddle mixers, as explained above with respect to FIG. 1.

For each continuous paddle mixer, the mixer configuration 90 (e.g. the configuration 90 shown in FIG. 7) is surrounded by one or more barrel segments extending the length of the mixer configuration. FIG. 8 illustrates, schematically, a typical barrel 105 surrounding the mixer configuration 90. A motor 101 drives the shafts 110 which support the mixer elements. The gum base ingredients are fed through feed ports 103 and 123 in the barrel 105. The gum base remains in the mixer for a sufficient time to ensure homogeneity, for example, a time on the order of about 20–30 minutes, and exits through an exit nozzle 155.

The barrel 105 of each paddle mixer may be heated and cooled. Heating may be accomplished using hot water or a steam jacket surrounding the barrel (not shown). Cooling may be accomplished by supplying cooling water to a jacket surrounding the barrel 105. Alternative methods of heating and cooling may also be employed. Generally, heating is applied at the start up, but cooling is applied in the latter stages to prevent overheating and base degradation. The heating and cooling of the barrel should be supplied, as necessary, to maintain the product exit temperatures at about 90°–150° C., preferably at about 100°–130° C., during mixing of the gum base ingredients. The temperatures can be different for the first and second continuous paddle mixers. From the first paddle mixer, the product exit temperature should be about 140°–200° C., whereas the product exit temperature from the second paddle mixer should be about 90°–150° C. and preferably 100°–130° C.

Figure 9:
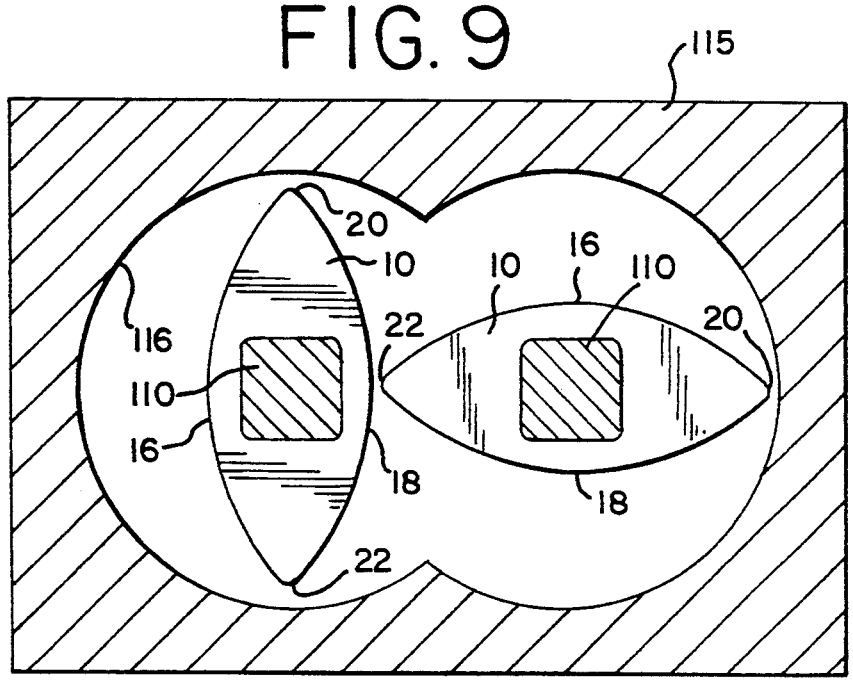
FIG. 9 is a front sectional cutout of a barrel, showing the relationship between the rotating paddles and the barrel wall.

FIG. 9 is a sectional view of the barrel 105 which indicates how each paddle mixer is able to operate with longer residence times, compared to a conventional twin screw extruder. As shown in FIG. 9, the barrel wall 116 has the shape of two intersecting cylinders, each cylinder having a diameter larger than the largest diameter of the mixing paddle 10 contained therein. This barrel configuration resembles that of a standard twin screw extruder. However, unlike the screws of a twin screw extruder, the paddles 10 do not mostly fill the space defined by the barrel wall 116.

The mixing paddles 10 have a typically close tolerance with the barrel wall 116, and with each other, in the vicinity of the lines 20 and 22 where the concave surfaces intersect. For paddles 10 having a long diameter of 4.874 inches, the closest tolerance between each paddle and the barrel wall 116 may be on the order of about 0.048 inch to about 0.078 inch, and the closest tolerance between the two paddles may be on the order of about 0.060 inch to about 0.090 inch. However, away from the lines 20 and 22, the distance between each paddle 10 and the barrel wall 116 is much greater. Due to the unique design of the paddles 10, the percentage of barrel space occupied by the paddles 10 is much smaller than for a conventional twin screw extruder. Also, the pressure in the paddle mixer should remain below about 50 psig, preferably below about 20 psig, when there is a large percentage of paddles compared to other elements. Each paddle 10, viewed from the front as in FIG. 9, has a smaller width than height. Preferably, the ratio of height to width of each mixing paddle is more than 1.5:1. Most preferably, the ratio of height to width for each mixing paddle is more than 2:1.

The large amount of available barrel space also allows each continuous paddle mixer to operate at relatively high residence times and lower pressure. The high proportion of mixing paddles, especially flat paddles, also contributes to the longer residence times. The average residence time in each paddle mixer should be at least about 5 minutes, preferably more than 10 minutes.

The remaining operating parameters, e.g., mixer rpm, feed rates, production rates, etc. vary depending on the size of each mixer and on the specific gum base composition. A commercially available paddle mixer suitable for practicing the invention is a Teledyne Readco Continuous Processor, available from Teledyne Readco in York, Pa. These paddle mixers are available in a wide variety of sizes. Paddle diameters for the different size mixers range from 2 to 24 inches, and the ratios of mixer length to diameter (L/D) range from 4:1 to 14:1. For purposes of the present invention, the maximum paddle diameter for each mixer is preferably between 2 inches and 5 inches, and the L/D for each mixer is preferably about 7:1. The paddle mixer configurations and process conditions should be selected so that a homogeneous gum base product is achieved.

A wide range of changes and modifications to the embodiments of the invention described above will be apparent to persons skilled in the art. The following examples are not to be construed as imposing limitations on the invention, but are included merely to illustrate preferred embodiments.

EXAMPLE 1

This example was performed using a 2-inch paddle diameter Teledyne Readco Continuous Mixer and a 5-inch paddle diameter Teledyne Readco Continuous Mixer in series, similar to the arrangement shown in FIG. 1, with the 2-inch paddle diameter mixer being first. The mixers were configured with the objective of accomplishing dispersive mixing of rubber using the 2-inch compounder, and distributive mixing of oil using the 5-inch compounder. Specifically, the 2-inch and 5-inch compounders were configured as described in Tables 2 and 3.

The 2-inch compounder included 4 inches of conveying elements, and a balance (13.25 inches) of reverse helical and flat paddles, for a total active length of 17.25 inches. A total of twenty-five reverse helical and flat paddles were used, each 0.53 inches long. The 5-inch compounder used paddles and conveying elements with the dimensions described above.

TABLE 2

Mixer Configuration (Per Shaft) For 2-inch Teledyne Readco Mixer

| Longitudinal Position | Element | Rotational Position | Longitudinal Position | Element | Rotational Position |
|---|---|---|---|---|---|
| 1 | FC | 4 | 16 | FP | 2 |
| 2 | FC | 4 | 17 | FP | 4 |
| 3 | FC | 4 | 18 | FP | 4 |
| 4 | FC | 4 | 19 | FP | 4 |
| 5 | FP | 4 | 20 | FP | 2 |
| 6 | FP | 4 | 21 | FP | 2 |
| 7 | FP | 4 | 22 | FP | 2 |
| 8 | FP | 2 | 23 | FP | 3 |
| 9 | FP | 2 | 24 | FP | 4 |
| 10 | FP | 2 | 25 | FP | 1 |
| 11 | FP | 4 | 26 | FP | 2 |
| 12 | FP | 4 | 27 | FP | 4 |
| 13 | FP | 4 | 28 | FP | 4 |
| 14 | FP | 2 | 29 | RH | 2 |
| 15 | FP | 2 | | | |

TABLE 3

Mixer Configuration (Per Shaft) For 5-inch Teledyne Readco Mixer

| Longitudinal Position | Element | Rotational Position | Longitudinal Position | Element | Rotational Position |
|---|---|---|---|---|---|
| 1 | FC | 4 | 19 | FP | 2 |
| 2 | FC | 4 | 20 | FP | 2 |
| 3 | FC | 4 | 21 | FP | 4 |
| 4 | FC | 4 | 22 | FP | 4 |
| 5 | FC | 4 | 23 | FP | 4 |
| 6 | FC | 4 | 24 | FP | 2 |
| 7 | FC | 4 | 25 | FP | 2 |
| 8 | FC | 4 | 26 | FP | 2 |
| 9 | FP | 4 | 27 | FP | 4 |
| 10 | FP | 4 | 28 | FP | 4 |
| 11 | FP | 4 | 29 | FP | 4 |
| 12 | FP | 2 | 30 | FP | 1 |
| 13 | FP | 2 | 31 | FP | 2 |
| 14 | FP | 2 | 32 | FP | 3 |
| 15 | FP | 4 | 33 | FP | 4 |
| 16 | FP | 4 | 34 | FP | 2 |
| 17 | FP | 4 | 35 | FP | 2 |
| 18 | FP | 2 | 36 | RH | 4 |

The feed ports were arranged as follows:

Feed Port No. 1—above longitudinal positions 1–4 on 2-inch mixer

Feed Port No. 2—above longitudinal positions 1–4 on 5-inch mixer

Feed Port No. 3 (oil injection)—at longitudinal position 9 on 5-inch mixer

Using the above mixer arrangement, chewing gum base was made as follows.

A mixture of ground isobutylene-isoprene copolymer (2–7 mm particle size) and calcium carbonate at a ratio of 10:13 was fed at a rate of 0.192 lbs/min to Feed Port No. 1. Also added at Feed Port No. 1 was 16 parts polyisobutylene at 130° C. at a rate of 0.133 lbs/min. At Feed Port No. 2, 22 parts polyvinyl acetate and 29 parts of a powder blend of hydrogenated vegetable oil, glycerol monostearate, and hydrogenated soybean oil at a ratio of 13:3:13 were added at a rate of 0.425 lbs/min. Also added at Feed Port No. 2 was a liquid blend at 70° C. of 5 parts hydrogenated cottonseed oil and 5 parts lecithin at a rate of 0.083 lbs/min. Feed Port No. 3 was not used.

Overall, the production rate for the gum base was 50 pounds per hour. The gum base was manufactured using the following process conditions:

|  | 2-Inch Mixer | 5-Inch Mixer |
| --- | --- | --- |
| RPM | 314 | 450 |
| Initial Barrel Temp., °F. | 265–270 | 225–230 |
| Product Exit Temp., °C. | 164 | 133 |
| Average Residence Time | 5–10 min. | 30–40 min. |

About 60 pounds of gum base product was made at these conditions. The gum base had normal color, a smooth texture, and a homogeneous consistency, except for an occasional wood sliver resulting from a previous use of the equipment.

EXAMPLE 2

This example was performed using the same two-mixer arrangement described in Example 1. The 2-inch and 5-inch Teledyne Readco Continuous Mixers were configured as described in Tables 2 and 3, above. The feed ports were arranged as described in Example 2.

Using the above mixer arrangement, bubble gum base was made as follows.

A mixture of styrene butadiene rubber, calcium carbonate (<12 micron particle size), and glycerol ester of wood rosin at a ratio of 9:46:18 was added at Feed Port No. 1 at a rate of 0.608 lbs/min. At Feed Port No. 2, a mixture of glycerol ester of wood rosin, glycerol monostearate, and microcystalline wax (M.P.=180° F.) at a ratio of 20:1:6 was added at a rate of 0.175 lbs/min. Feed Port No. 3 was not used.

Overall, the production rate for the bubble gum base was 47 pounds per hour. The gum base was manufactured using the following process conditions:

|  | 2-Inch Mixer | 5-Inch Mixer |
| --- | --- | --- |
| RPM | 314 | 450 |
| Initial Barrel Temp., °F. | not recorded | 225–230 |
| Product Exit Temp., °C. | 140 | not recorded |
| Average Residence Time | 2–6 min. | 30–40 min. |

About 40 pounds of bubble gum base was made at these conditions. The gum base had normal color, a smooth texture, and a homogeneous consistency.

EXAMPLE 3

This example was performed using a two-mixer arrangement described in Example 1, except for the following changes. Again, the 2-inch Teledyne Readco Continuous Mixer was configured as described in Table 2 of Example 1. However, the 5-inch Teledyne Readco Continuous Mixer was configured as described in Table 1 (FIG. 7) except that a reverse helical paddle was placed in position 19. The feed ports were arranged as follows:

Feed Port No. 1—above longitudinal positions 1–4 on 2-inch mixer

Feed Port No. 2—above longitudinal positions 1–4 on 5-inch mixer

Feed Port No. 3—above longitudinal positions 20–23 on 5-inch mixer

Using the above mixer arrangement, chewing gum base was made as follows.

A mixture of ground isobutylene-isoprene copolymer (2–7 mm particle size), calcium carbonate (<12 micron particle size), and terpene resin at a ratio of 8:21:17 was fed at a rate of 0.383 lbs/min at the first feed inlet. In the second feed inlet, a powder blend of polyvinyl acetate, glycerol monostearate, and hydrogenated soybean and vegetable oil at a ratio of 24:5:13 were fed at a rate of 0.35 lbs/min. In the third feed port, 6 parts of polyisobutylene at 130° C. at a feed rate of 0.05 lbs/min and 6 parts of a 50/50 mixture of hydrogenated cottonseed oil/lecithin at 70° C. at a feed rate of 0.05 lbs/min were added.

Overall, the production rate for the gum base was 50 pounds per hour. The gum base was manufactured using the following process conditions:

|  | 2-Inch Mixer | 5-Inch Mixer |
| --- | --- | --- |
| RPM | 310 | 387 |
| Initial Barrel Temp., °F. | 275–280 | 235–240 |
| Product Exit Temp., °C. | 162 | 120 |
| Average Residence Time | 2–6 min. | 30–40 min. |

About 40 pounds of gum base product was made at these conditions. The gum base had normal color, a smooth texture, and a homogeneous consistency, except for an occasional isolated undispersed particle.

EXAMPLE 4

This example was performed using a two-mixer arrangement with two 5-inch Teledyne Readco Continuous Mixer Compounders. The first Compounder was configured the same as in Table 3 of Example 1. The second Compounder was configured based on Table 1, shown previously. This configuration is also shown in FIG. 7.

The feed ports were arranged as follows:

Feed Port No. 1—above longitudinal positions 1–4 on first 5-inch mixer

Feed Port No. 2—above longitudinal positions 1–4 on second 5-inch mixer

Feed Port No. 3—above longitudinal positions 20–23 on second 5-inch mixer.

Using the above mixer arrangement, chewing gum base was made as follows:

A mixture of ground isobutylene-isoprene copolymer (2–7 mm particle size), calcium carbonate (<12 micron particle size), terpene resin, and powder color at a ratio of 11:18:17:1 was fed at a rate of 1.435 lbs./min. in the first feed inlet. In the second feed inlet, a powder blend of polyvinyl acetate, glycerol monostearate, and hydrogenated soybean and vegetable oil at a ratio of 24:5:12 was fed at a rate of 1.264 lbs./min. In the third feed port, 6 parts of polyisobutylene at 95° C. at a feed rate of 0.181 lbs./min. and 6 parts of 50/50 mixture of hydrogenated cottonseed oil/lecithin at 80° C. at a feed rate of 0.203 lbs./min. were added.

Overall, the production rate for the gum base was about 185 pounds per hour. The gum base was manufactured using the following process conditions:

|  | First 5-inch Mixer | Second 5-inch Mixer |
| --- | --- | --- |
| RPM | 250 | 400 |
| Initial Barrel Temp., °C. | 135 | 115 |
| Product Exit Temp., °C. | 190 | 115 |
| Average Residence | 20 min. | 10 min. |

-continued

| Time | First 5-inch Mixer | Second 5-inch Mixer |
| --- | --- | --- |

About 200 pounds of gum base product was made. The gum base had normal color, no lumps, no unincorporated oil, but had a burnt off taste and odor.

EXAMPLE 5

This example was performed using a two-mixer arrangement with two 5-inch Teledyne Readco Continuous Mixer Compounders. Both compounders were configured with the same paddle configuration that was shown in Table 1. Four feed ports were arranged as follows:

Feed Port No. 1—above longitudinal positions 1–4 on first 5-inch mixer
Feed Port No. 2—above longitudinal positions 20–23 on first 5-inch mixer
Feed Port No. 3—above longitudinal positions 1–4 on second 5-inch mixer
Feed Port No. 4—above longitudinal positions 20–23 on second 5-inch mixer Using the above mixer arrangement, chewing gum base was made as follows:

A mixture of ground isobutylene-isoprene copolymer (2–7 mm particle size), calcium carbonate (<12 micron particle size), and polyvinyl acetate at a ratio of 13:10:7 was fed at a rate of 0.75 lbs./min. in the first feed inlet. In the second feed inlet, 15 parts of polyvinyl acetate was added at 0.375 lbs./min. In the third feed port, hydrogenated vegetable oil, hydrogenated soybean oil, and glycerol monostearate at a ratio of 13:13:3 were added at a rate of 0.725 lbs./min. In the fourth feed port, 10 parts of partially hydrogenated vegetable oil at 0.25 lbs./min., and 16 parts of polyisobutylene at 130° C. at a rate of 0.40 lbs./min. were added.

Overall the production rate for the gum base was 150 pounds per hour. The gum base was manufactured using the following process conditions:

| | First 5-inch Mixer | Second 5-inch Mixer |
| --- | --- | --- |
| RPM | 373 | 374 |
| Initial Barrel Temp., °C. | 150–180 | 110 |
| Product Exit Temp., °C. | 165–191 | 111 |
| Average Residence Time | 20–30 min. | 12–15 min. |

About 400 pounds of gum base product was made. The gum base had normal color, no lumps, no unincorporated oil, and clean taste and odor.

EXAMPLE 6

This example was made using the same equipment, mixer arrangement, screw configuration, and feed ports as Example 5, except feed port No. 2 was closed off. The gum base was made as follows:

A mixture of ground isobutylene-isoprene copolymer (2–7 mm particle size), calcium carbonate (<12 micron particle size), terpene resin, and polyvinyl acetate at a ratio of 11:18:17:6 was fed at a rate of 1.30 lbs./min. in the first feed inlet. In the third feed inlet, a powder blend of polyvinyl acetate, glycerol monostearate, hydrogenated soybean and vegetable oil, and powdered color at a ratio of 18:5:12:1 was fed at a rate of 0.90 lbs./min. In the fourth feed inlet, 6 parts of polyisobutylene at 130° C. was added at a rate of 0.15 lbs./min., and 6 parts of a 50/50 blend of lecithin and hydrogenated cottonseed oil at 90° C. was added at a rate of 0.15 lbs./min.

Overall, the production rate for the gum base was 150 pounds per hour. The gum base was manufactured using the following process conditions:

| | First 5-inch Mixer | Second 5-inch Mixer |
| --- | --- | --- |
| RPM | 300 | 373 |
| Initial Barrel Temp., °C. | 150–180 | 110 |
| Product Exit Temp., °C. | 172 | 113 |
| Average Residence Time | 20–30 min. | 12–15 min. |

About 400 pounds of gum base product was made. The gum base had normal color, no lumps, no unincorporated oil, and clean taste and odor.

Gum bases of Examples 5 and 6 were analyzed by Gel Permeation Chromatography (GPC) and compared to the same formulation of base made by conventional batch processes. Analyses showed that the isobutylene-isoprene copolymer of Examples 5 and 6 was over sheared and degraded. Also, sugar gum formulations were made to compare sensory attributes of bases from Examples 5 and 6 to base made by the conventional batch process. Tests showed that bases of Examples 5 and 6 gave a much softer texture than the bases from the conventional batch process.

EXAMPLE 7

This example was performed using the two-mixer arrangement with two 5-inch Teledyne Readco Continuous Mixer Compounders. Both compounders were configured according to the following Table 5. The feed ports were the same as Example 6.

TABLE 5

| Mixer Configuration (Per Shaft) | | | | | |
| --- | --- | --- | --- | --- | --- |
| Longitudinal Position | Element | Rotational Position | Longitudinal Position | Element | Rotational Position |
| 1 | FC | 4 | 19 | FP | 3 |
| 2 | FC | 4 | 20 | FC | 3 |
| 3 | FC | 4 | 21 | FC | 3 |
| 4 | FC | 4 | 22 | FC | 3 |
| 5 | FC | 4 | 23 | FC | 3 |
| 6 | FC | 4 | 24 | FC | 3 |
| 7 | FC | 4 | 25 | FC | 3 |
| 8 | FC | 4 | 26 | FC | 3 |
| 9 | FP | 4 | 27 | FC | 3 |
| 10 | FP | 4 | 28 | FP | 2 |
| 11 | FP | 4 | 29 | FP | 2 |
| 12 | FP | 2 | 30 | FP | 4 |
| 13 | FP | 2 | 31 | FP | 4 |
| 14 | FP | 2 | 32 | FP | 4, |
| 15 | FP | 4 | 33 | FP | 2 |
| 16 | FP | 4 | 34 | FP | 2 |
| 17 | FP | 1 | 35 | FP | 4 |
| 18 | FP | 2 | 36 | RH | 4 |

Using the above mixture arrangement, chewing gum base was made as follows:

A mixture of ground isobutylene-isoprene copolymer (2–7 mm particle size), calcium carbonate, terpene resins, and polyvinyl acetate at a ratio of 11:18:17:1 was added at a rate of 1.175 lbs./min. to feed inlet No. 1. To feed inlet No. 3 a powder blend of polyvinyl acetate, glycerol monostearate, hydrogenated soybean and vegetable oils, and powdered color at a ratio of 23:5:12:1 was fed at a rate of 1.025 lbs./min. To feed inlet No. 4, 6 parts of polyisobutylene at 130° C. was added at a rate of 0.15 lbs./min., and 6 parts of a 50/50 blend of lecithin and hydrogenated cottonseed oil at 90° C. was added at a rate of 0.15 lbs./min.

Overall the production rate for the gum base was 150 pounds per hour. The gum base was manufactured using the following process conditions:

|  | First 5-inch Mixer | Second 5-inch mixer |
|---|---|---|
| RPM | 250 | 376 |
| Initial Barrel Temp., °C. | 150–180 | 110 |
| Product Exit Temp., °C. | 175 | 120 |
| Average Residence Time | 20–30 min. | 12–15 min. |

About 350 pounds of gum base was made. The gum base had normal color, no lumps, no unincorporated oil, and clean taste and odor. Analysis of the gum base by GPC indicated it was very similar to the same base formula made by a conventional batch process. Also, gum made from base of this example had sensory properties virtually the same as gum made with base from the conventional batch process.

Based on these and other runs, it was concluded that the use of two continuous mixers in series is an effective technique for manufacturing gum base on a continuous basis. The optimum process conditions, and the configurations of the two mixers, vary depending on the specific gum base composition and the desired output rate.

While the embodiments of the invention disclosed herein are presently considered to be preferred, various modifications and improvements can be made without departing from the spirit and scope of the invention. The scope of the invention is indicated in the appended claims, and all changes that come within the meaning and range of equivalents are intended to be embraced therein.

We claim:

1. A method of making chewing gum base on a continuous basis, comprising the steps of:
    providing a first continuous mixer and a second continuous mixer arranged in series;
    continuously feeding about 5–95% elastomer to the first continuous mixer, based on the weight of the gum base;
    continuously feeding about 0–75% elastomer plasticizer to the first continuous mixer, based on the weight of the gum base;
    continuously feeding about 1–65% fillers to the first continuous mixer, based on the weight of the gum base;
    continuously mixing the elastomer, elastomer plasticizer and filler together in the first continuous mixer to form a blend which continuously exits from the first continuous mixer;
    continuously feeding the blend from the first continuous mixer to the second continuous mixer;
    continuously feeding about 0.5–40% softener/emulsifier to the second continuous mixer, based on the weight of the gum base; and
    continuously blending the ingredients together in the second continuous mixer until a homogeneous gum base is obtained.

2. The method of claim 1, wherein a portion of the elastomer entering the first continuous mixer is fed downstream from a remaining portion of elastomer and filler.

3. The method of claim 1, wherein a portion of the filler and at least a portion of the elastomer plasticizer entering the first continuous mixer are fed downstream from a remaining portion of filler and elastomer.

4. The method of claim 1, wherein at least a portion of the elastomer plasticizer entering the first continuous mixer is fed downstream from at least a portion of the elastomer and at least a portion of the filler.

5. The method of claim 1, wherein at least a portion of the elastomer plasticizer entering the first continuous mixer is fed downstream from a remaining portion of elastomer plasticizer, at least a portion of the elastomer, and at least a portion of the filler.

6. The method of claim 1, wherein further elastomer plasticizer is continuously fed to the second continuous mixer and is not fed to the first continuous mixer.

7. The method of claim 1, wherein at least a portion of the softener/emulsifier entering the second continuous mixer is fed downstream from the blend from the first continuous mixer.

8. The method of claim 6, wherein at least a portion of the softener/emulsifier entering the second continuous mixer is fed downstream from the further elastomer plasticizer.

9. The method of claim 6, wherein the further elastomer plasticizer comprises polyvinyl acetate.

10. The method of claim 1, wherein the elastomer comprises a synthetic material selected from the group consisting of polyisobutylene, isobutylene-isoprene copolymer, styrene-butadiene copolymer, polyvinyl acetate, vinyl acetate-vinyl laurate copolymer, and combinations thereof.

11. The method of claim 1, wherein the elastomer comprises a natural material selected from the group consisting of latex, guayule, natural gums, and combinations thereof.

12. The method of claim 1, wherein the elastomer plasticizer is present and comprises a material selected from the group consisting of natural rosin esters and synthetic terpine resins.

13. The method of claim 1, wherein the softener/emulsifier comprises a material selected from the group consisting of tallow, hydrogenated tallow, hydrogenated and partially hydrogenated vegetable oils, cocoa butter, glycerol monostearate, glycerol triacetate, lecithin, glycerides, fatty acids, and combinations thereof.

14. The method of claim 1, wherein the fillers comprise a material selected from the group consisting of carbonates, limestone, silicates, clay, alumina, talc, titanium oxide, phosphates of calcium, cellulose materials, and combinations thereof.

15. A method of making chewing gum base on a continuous basis, comprising the steps of:
    providing a first continuous mixer and a second continuous mixer arranged in series;
    continuously feeding a higher viscosity portion to the first continuous mixer;
    continuously mixing the higher viscosity portion in the first continuous mixer to form a blend which continuously exits the first continuous mixer;
    continuously feeding the blend from the first continuous mixer to the second continuous mixer;
    continuously feeding a lower viscosity portion to the second continuous mixer; and continuously blending the ingredients together in the second continuous mixer to continuously produce a chewing gum base.

16. The method of claim 15, wherein the higher viscosity portion comprises elastomer and filler.

17. The method of claim 16, wherein the higher viscosity portion further comprises elastomer plasticizer.

18. The method of claim 15, wherein the lower viscosity portion comprises softener/emulsifier.

19. The method of claim 18, wherein the lower viscosity portion further comprises polyvinyl acetate.

20. The method of claim 15, further comprising the step of ventilating the blend from the first continuous mixer before the blend enters the second continuous mixer.

21. The method of claim 15, wherein the higher viscosity portion comprises ingredients fed at upstream and downstream locations in the first continuous mixer.

22. The method of claim 21, wherein the ingredients fed of the upstream location of the first continuous mixer have a higher combined viscosity than the ingredients fed at the downstream location of the first continuous mixer.

23. The method of claim 15, wherein at least some of the lower viscosity portion is fed to the second continuous mixer at a location downstream from the blend from the first continuous mixer.

24. A method of making chewing gum base on a continuous basis, comprising the steps of:
continuously mixing a higher viscosity portion including 5–95% elastomer, 0–75% elastomer plasticizer, and 1–65% by weight filler, by weight of the gum base, in a first continuous mixer, to form a blend;
ventilating the blend from the first continuous mixer; and
continuously mixing the blend from the first continuous mixer with 0.5–40% softener/emulsifier by weight of the gum base, in a second continuous mixer, to form a chewing gum base.

25. The method of claim 24, further comprising the step of continuously adding up to 30% wax to the second continuous mixer, by weight of the gum base.

* * * * *